(12) United States Patent
Silverman et al.

(10) Patent No.: US 12,712,772 B2
(45) Date of Patent: Aug. 18, 2026

(54) AMBIENT POWER BACKSCATTER EXCITATION EXTENSION FOR PHYSICAL LAYER PROTOCOL DATA UNITS

(71) Applicant: Cisco Technology, Inc., San Jose, CA (US)

(72) Inventors: Matthew A. Silverman, Shaker Heights, OH (US); Sivadeep Reddy Kalavakuru, Akron, OH (US); Ardalan Alizadeh, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 376 days.

(21) Appl. No.: 18/459,544

(22) Filed: Sep. 1, 2023

(65) Prior Publication Data

US 2024/0380535 A1 Nov. 14, 2024

Related U.S. Application Data

(60) Provisional application No. 63/501,824, filed on May 12, 2023.

(51) Int. Cl.

*H04L 27/26* (2006.01)
*H04B 7/22* (2006.01)
*H04W 84/12* (2009.01)

(52) U.S. Cl.

CPC .......... *H04L 27/2602* (2013.01); *H04B 7/22* (2013.01); *H04W 84/12* (2013.01)

(58) Field of Classification Search

CPC . H04B 5/77; H04B 7/22–2696; H04W 84/12; H04L 27/2602

See application file for complete search history.

(56) References Cited

U.S. PATENT DOCUMENTS

| | | | | |
|---|---|---|---|---|
| 10,447,331 | B2 * | 10/2019 | Gollakota | H04B 1/40 |
| 2014/0062672 | A1 | 3/2014 | Gudan et al. | |
| 2018/0212807 | A1 | 7/2018 | Zhang et al. | |
| 2019/0274144 | A1 * | 9/2019 | Zhang | H04B 7/22 |

(Continued)

FOREIGN PATENT DOCUMENTS

| | | |
|---|---|---|
| CN | 111447662 A | 7/2020 |
| KR | 101590293 B1 | 2/2013 |
| WO | 2022170294 A1 | 8/2022 |

OTHER PUBLICATIONS

International Search Report and Written Opinion for International Application No. PCT/US2024/028903, mailed Sep. 2, 2024, 13 Pages.

(Continued)

*Primary Examiner* — Pao Sinkantarakorn
(74) *Attorney, Agent, or Firm* — Merchant & Gould P.C.

(57) ABSTRACT

Physical Layer Protocol Data Units (PPDUs) with an extension and specifically PPDUs with an extension for Ambient Power (AMP) Backscatter Device (BKD) excitation may be provided. A PPDU with an AMP BKD excitation extension can include an AMP BKD excitation extension field indicating the version and duration of the AMP BKD excitation extension. A method for providing the PPDU with the AMP BKD excitation extension includes generating the PPDU with the AMP BKD excitation extension and the AMP BKD excitation extension field and transmitting the PPDU with the AMP BKD excitation extension.

11 Claims, 2 Drawing Sheets

(56) References Cited

U.S. PATENT DOCUMENTS

| | | | | |
|---|---|---|---|---|
| 2021/0194528 | A1 | 6/2021 | Zalewski et al. | |
| 2021/0368439 | A1 | 11/2021 | Karimaruthumkal et al. | |
| 2022/0346187 | A1 | 10/2022 | Zhang et al. | |
| 2024/0214120 | A1* | 6/2024 | Lanante | H04L 1/0003 |
| 2024/0396774 | A1* | 11/2024 | Ma | H04L 5/0048 |
| 2025/0016825 | A1* | 1/2025 | He | H04W 74/0866 |

OTHER PUBLICATIONS

Lu, Xiao et al. “Ambient Backscatter-Assisted Wireless-Powered Relaying” arxiv.org; arXiv:2102.01639 [cs.IT] (or arXiv:2102.01639v1 [cs.IT] for this version): https://doi.org/10.48550/arXiv.2102.01639; Feb. 2, 2021 (32 pages).

* cited by examiner

200

202 Legacy Preamble | 204 UHR-Preamble | 206 Payload | 208 AMP BKD Extension

AMBIENT POWER BACKSCATTER EXCITATION EXTENSION FOR PHYSICAL LAYER PROTOCOL DATA UNITS

RELATED APPLICATION

Under provisions of 35 U.S.C. § 119(e), Applicant claims the benefit of U.S. Provisional Application No. 63/501,824, filed May 12, 2023, which is incorporated herein by reference.

TECHNICAL FIELD

The present disclosure relates generally to providing Physical Layer Protocol Data Units (PPDUs) with an extension and specifically to providing PPDUs with an extension for Ambient Power (AMP) Backscatter Device (BKD) excitation.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figures 1, 2:
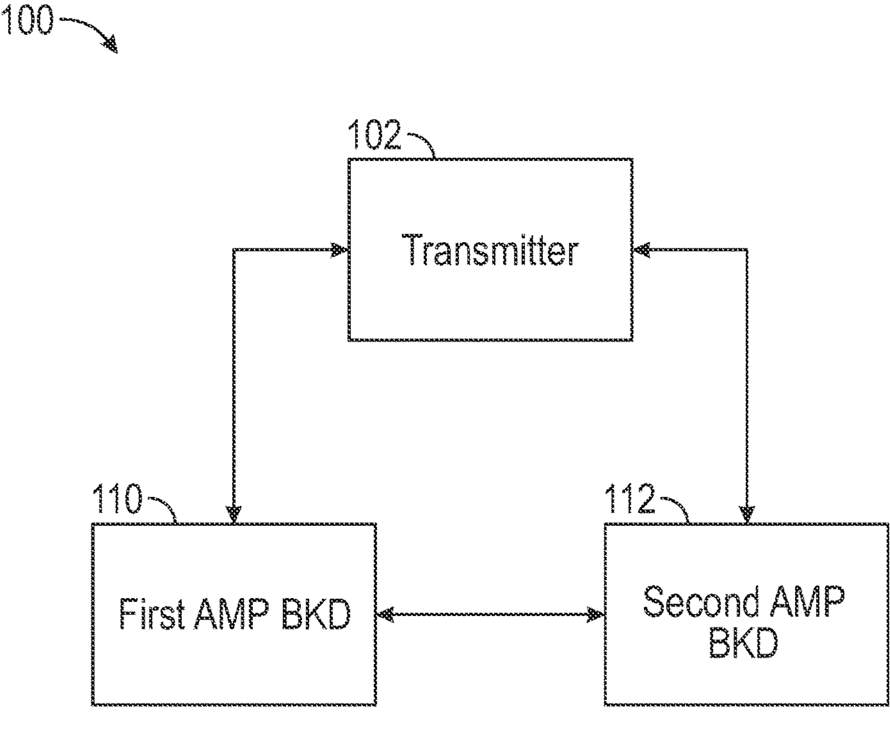
FIG. 1 is a block diagram of an operating environment for transmitting Physical Layer Protocol Data Units (PPDUs) with an Ambient Power (AMP) Backscatter Device (BKD) excitation extension.
FIG. 2 is a block diagram of a PPDU with an AMP BKD excitation extension.

Physical Layer Protocol Data Units (PPDUs) with an extension and specifically PPDUs with an extension for Ambient Power (AMP) Backscatter Device (BKD) excitation may be provided. A PPDU with an AMP BKD excitation extension can include an AMP BKD excitation extension field indicating the version and duration of the AMP BKD excitation extension. A method for providing the PPDU with the AMP BKD excitation extension includes generating the PPDU with the AMP BKD excitation extension and the AMP BKD excitation extension field and transmitting the PPDU with the AMP BKD excitation extension.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Ambient Power (AMP) Backscatter Devices (BKDs) can use Radio Frequency (RF) signals to transmit data without a power source such as a battery or a connection to electricity. The AMP BKDs may use an antenna to receive a RF signal, use the RF signal for excitation (e.g., convert the RF signal into electricity), and use the power to modify and reflect the RF signal with data. In some examples, the AMP BKDs modulate or otherwise modify the RF signal to include encoded data. Other devices can receive a reflected RF signal transmitted by an AMP BKD to determine the data the AMP BKD is sending. AMP BKD operations may be described in documents and standards from the Institute of Electrical and Electronics Engineers (IEEE). For example, the IEEE AMP topic interest group and the IEEE 802.11 standard may describe the operations of AMP BKDs.

Transmitters, such as an Access Point (AP), a Station (STA), and/or the like, may transmit a Physical Layer Protocol Data Unit (PPDU) specifically for the excitation of an AMP BKD. However, transmitting PPDUs exclusively for AMP BKD excitation may increase network congestion or otherwise limit Media Access Control (MAC) efficiency because PPDUs meant only for AMP BKD excitation are using Transmit Opportunities (TxOps) that an AP or other transmitter could use for other network operations. Using PPDUs with information for other network operations (e.g., a full Bandwidth (BW) legacy PPDU) for AMP BKD excitation will therefore improve network performance.

Because of the information already encoded in a PPDU for other network operations, AMP BKDs that use the RF of a PPDU for other network operations for excitation may have a limited operation (e.g., limited ability to modulate the RF for sending information because of the existing information in the PPDU) and may make decoding the modulated RF signal more difficult. Therefore, a PPDU with an AMP BKD excitation extension can alleviate the issues described above associated with sending PPDUs only meant for AMP BKD excitation and using PPDUs for other network operations for AMP BKD excitation.

FIG. 1 is a block diagram of an operating environment 100 for transmitting PPDUs with an AMP BKD excitation extension. The operating environment 100 includes a transmitter 102, a first AMP BKD 110, and a second AMP BKD 112. The transmitter 102 may be any device that can send RF transmissions, such as an AP, a STA, and/or the like. The first AMP BKD 110 and the second AMP BKD 112 may be devices that do not use a power source such as a battery or an electrical connection.

The first AMP BKD 110 and the second AMP BKD 112 may use transmissions the transmitter 102 and/or other devices transmit for excitation, modulate the transmission, and reflect the transmission with encoded data. In other examples, there may be more or fewer transmitters and/or AMP BKDs.

The transmitter 102 may transmit a PPDU with an AMP BKD excitation extension to allow the first AMP BKD 110 and/or the second AMP BKD 112 to operate and include information for another device (e.g., a STA). Thus, the PPDU with the AMP BKD excitation extension does not use a TxOp solely for allowing the AMP BKD 110 and/or the second AMP BKD 112 to operate. An example PPDU with an AMP BKD excitation extension is described in more detail herein.

FIG. 2 is a block diagram of a PPDU 200 with an AMP BKD excitation extension. The PPDU 200 includes a legacy preamble 202, an Ultra High Reliability (UHR) preamble 204 (e.g., as defined by the IEEE 802.11 bn standard), a payload 206, and an AMP BKD excitation extension 208. The legacy preamble 202 may include one or more fields such as a Legacy Short Training Field (L-STF), a Legacy Long Training Field (L-LTF), and a Legacy Signal Field (L-SIG). Devices can use the S-LTF to begin packet detection, perform automatic gain control, perform frequency offset estimation, perform initial time synchronization, and/or the like. Devices can use the L-LTF to perform channel estimation, perform a more accurate frequency offset estimation compared to the estimation performed when the S-LTF is received, perform more accurate time synchronization compared to the estimation performed when the S-LTF is received, and/or the like. Devices can use the L-SIG to determine packet information for the received configuration such as data rate, data length, transmission time, and/or the like. The payload 206 may include the data the transmitter 102 determines to transmit to another device when transmitting the PPDU 200. The payload 206 can include a service field, a variable length field with the data being transmitted, a tail, and/or pad bits.

The AMP BKD excitation extension 208 may be an extension for the first AMP BKD 110 and/or the second AMP BKD 112 to utilize for excitation and operation. The first AMP BKD 110 and/or the second AMP BKD 112 may use the AMP BKD excitation extension 208 for excitation and operation because the AMP BKD excitation extension 208 will not have data encoded for other network operations. The AMP BKD excitation extension 208 can be one of multiple versions, such as a single Continuous Waveform (CW) tone, multiple CW tones at specific frequencies, a symbol like a L-LTF that cyclically repeats but only specific subcarriers are populated, and/or the like. The AMP BKD excitation extension 208 may also have a defined duration.

The UHR preamble 204 may include one or more fields, such as the fields described in the IEEE 802.11 bn standard. The UHR preamble 204 may also include an AMP BKD excitation extension field to indicate whether the AMP BKD excitation extension 208 is included in the PPDU 200. The AMP BKD excitation extension field may also indicate details of the AMP BKD excitation extension 208. For example, the AMP BKD excitation extension field can indicate the version of the AMP BKD excitation extension 208 (e.g., a single CW tone, multiple CW tones at specific frequencies, a symbol similar to a L-LTF that cyclically repeats with specific subcarriers populated, etc.). The AMP BKD excitation extension field may indicate the version with a value, such as a value assigned to two bits of the AMP BKD excitation extension field (e.g., 0x0 indicating not AMP BKD excitation extension 208 is included in the PPDU, 0x1 indicating a first version, 0x2 indicating a second version, 0x3 indicating a third version, etc.).

The AMP BKD excitation extension field may also indicate the AMP BKD excitation extension 208 duration. The AMP BKD excitation extension field may indicate the duration with a value, such as a value assigned to two bits of the AMP BKD excitation extension field. In some examples, the duration options may be predefined (e.g., 0x0 indicating 20 microseconds, 0x1 indicating 40 microseconds, etc.). In other examples, a number of bits can be used to indicate any duration of time. In yet other examples, the bits can be used as values for the equation two to the x minus 1, where 0x0 indicates 64 microseconds, 0x1 indicates 128 microseconds, 0x3 indicates 256 microseconds, etc. A device (e.g., a STA) that receives the PPDU 200 may use the AMP BKD excitation extension field to determine a time to wait after the payload 206 before transmitting a reply (e.g., an Acknowledge (ACK), Block ACK (BA), multi-STA BA, etc.).

Figure 3:
FIG. 3 is a flow chart of a method for AMP BKD excitation using a PPDU with an AMP BKD excitation extension.
Figure 3:
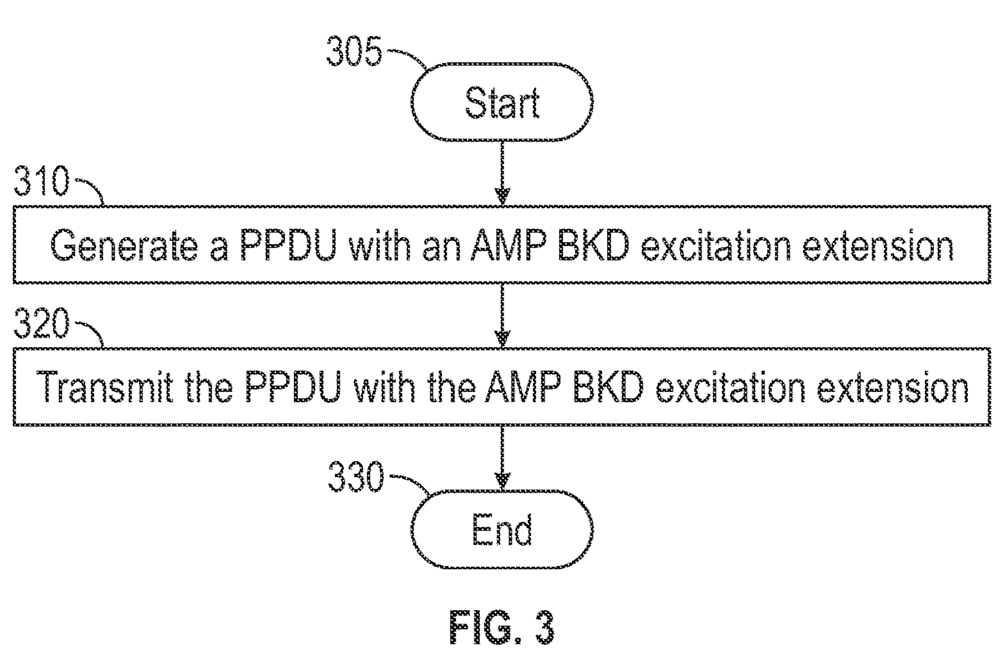

FIG. 3 is a flow chart of a method 300 for AMP BKD excitation using a PPDU with an AMP BKD excitation extension. The method 300 may begin at starting block 305 and proceed to operation 310. In operation 310, a PPDU with an AMP BKD excitation extension is generated. For example, the transmitter 102 generates the PPDU 200 including the AMP BKD excitation extension. The transmitter 102 may generate the PPDU 200 to communicate data to a device, such as an STA. Generating the PPDU 200 can include generating the data, duration, and/or version for the legacy preamble 202, the UHR preamble 204, the payload 206, and/or the AMP BKD excitation extension 208. The transmitter 102 may determine the duration and version of the AMP BKD excitation extension 208 and set the AMP BKD excitation extension field to indicate the AMP BKD excitation extension 208 version and duration.

In operation 320, the PPDU with the AMP BKD excitation extension is transmitted. For example, the transmitter 102 transmits the PPDU 200 to a STA. The STA may determine the duration of the AMP BKD excitation extension 208 based on the AMP BKD excitation extension field and delay sending a reply for the duration. The method 300 may conclude at ending block 330.

Figure 4:
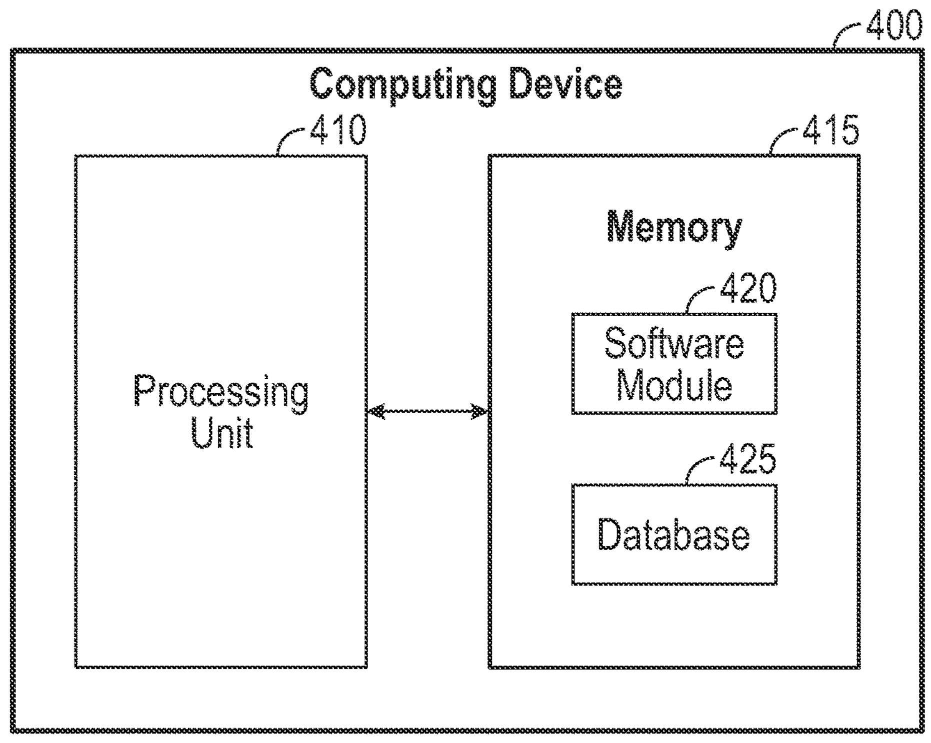
FIG. 4 is a block diagram of a computing device.

FIG. 4 is a block diagram of a computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing PPDUs with an extension and specifically to providing PPDUs with an extension for AMP BKD excitation with respect to FIG. 1, FIG. 2, and FIG. 3. Computing device 400, for example, may provide an operating environment for the transmitter 102, the first AMP BKD 110, the second AMP BKD 112, and the like. The transmitter 102, the first AMP BKD 110, the second AMP BKD 112, and the like may operate in other environments and are not limited to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples, and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general-purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:

generating a Physical Layer Protocol Data Unit (PPDU) with an Ambient Power (AMP) Backscatter Device (BKD) excitation extension including setting an AMP BKD excitation extension field indicating the AMP BKD excitation extension is included wherein generating the PPDU with the AMP BKD excitation extension comprises determining a version and a duration of the AMP BKD excitation extension wherein the AMP BKD excitation extension field indicates the version and the duration; and transmitting the PPDU with the AMP BKD excitation extension wherein transmitting the PPDU with the AMP BKD excitation extension comprises transmitting the PPDU with the AMP BKD excitation extension to a Station (STA), wherein the STA delays a reply to the PPDU with the AMP BKD excitation extension based on the duration indicated by the AMP BKD excitation extension field.

2. The method of claim 1, wherein the version is any one of a single Continuous Waveform (CW tone), multiple CW tones at specific frequencies, or a symbol similar to a L-LTF that cyclically repeats with specific subcarriers populated.

3. The method of claim 1, wherein:

the PPDU with the AMP BKD excitation extension comprises a payload; and the AMP BKD excitation extension is after the payload.

4. The method of claim 1, wherein:

the PPDU with the AMP BKD excitation extension comprises an Ultra High Reliability (UHR) preamble; and the AMP BKD excitation extension field is part of the UHR preamble.

5. A system comprising:

a memory storage; and a processing unit coupled to the memory storage, wherein the processing unit is operative to:

generate a Physical Layer Protocol Data Unit (PPDU) with an Ambient Power (AMP) Backscatter Device (BKD) excitation extension including setting an AMP BKD excitation extension field indicating the AMP BKD excitation extension is included wherein to generate the PPDU with the AMP BKD excitation extension comprises to determine a version and a duration of the AMP BKD excitation extension wherein the AMP BKD excitation extension field indicates the version and the duration; and transmit the PPDU with the AMP BKD excitation extension wherein to transmit the PPDU with the AMP BKD excitation extension comprises to transmit the PPDU with the AMP BKD excitation extension to a Station (STA), wherein the STA delays a reply to the PPDU with the AMP BKD excitation extension based on the duration indicated by the AMP BKD excitation extension field.

6. The system of claim 5, wherein the version is any one of a single Continuous Waveform (CW tone), multiple CW tones at specific frequencies, or a symbol similar to a L-LTF that cyclically repeats with specific subcarriers populated.

7. The system of claim 5, wherein:

the PPDU with the AMP BKD excitation extension comprises a payload; and the AMP BKD excitation extension is after the payload.

8. The system of claim 5, wherein:

the PPDU with the AMP BKD excitation extension comprises an Ultra High Reliability (UHR) preamble; and the AMP BKD excitation extension field is part of the UHR preamble.

9. A non-transitory computer-readable medium that stores a set of instructions which when executed perform a method executed by the set of instructions comprising:

generating a Physical Layer Protocol Data Unit (PPDU) with an Ambient Power (AMP) Backscatter Device (BKD) excitation extension including setting an AMP BKD excitation extension field indicating the AMP BKD excitation extension is included wherein generating the PPDU with the AMP BKD excitation extension comprises determining a version and a duration of the AMP BKD excitation extension wherein the AMP BKD excitation extension field indicates the version and the duration; and transmitting the PPDU with the AMP BKD excitation extension wherein transmitting the PPDU with the AMP BKD excitation extension comprises transmitting the PPDU with the AMP BKD excitation extension to a Station (STA), wherein the STA delays a reply to the PPDU with the AMP BKD excitation extension based on the duration indicated by the AMP BKD excitation extension field.

10. The non-transitory computer-readable medium of claim 9, wherein:

the PPDU with the AMP BKD excitation extension comprises a payload; and the AMP BKD excitation extension is after the payload.

11. The non-transitory computer-readable medium of claim 9, wherein:

the PPDU with the AMP BKD excitation extension comprises an Ultra High Reliability (UHR) preamble; and the AMP BKD excitation extension field is part of the UHR preamble.

* * * * *